United States Patent [19]

Albrecht et al.

[11] Patent Number: 5,221,415
[45] Date of Patent: Jun. 22, 1993

[54] METHOD OF FORMING MICROFABRICATED CANTILEVER STYLUS WITH INTEGRATED PYRAMIDAL TIP

[75] Inventors: Thomas R. Albrecht; Shinya Akamine, both of Stanford; Thomas E. Carver, Mountain View; Mark J. Zdeblick, Los Altos Hills, all of Calif.

[73] Assignee: Board of Trustees of the Leland Stanford Junior University, Stanford, Calif.

[21] Appl. No.: 618,054

[22] Filed: Nov. 26, 1990

Related U.S. Application Data

[62] Division of Ser. No. 297,769, Jan. 17, 1989, abandoned.

[51] Int. Cl.⁵ .......................................... H01L 21/306
[52] U.S. Cl. ..................... 156/629; 156/657; 437/228
[58] Field of Search .................. 156/657, 662, 659.1, 156/647, 646, 653, 628, 629; 437/228

[56] References Cited

U.S. PATENT DOCUMENTS

| | | | |
|---|---|---|---|
| 4,307,507 | 12/1981 | Gray et al. | 437/228 |
| 4,685,996 | 8/1987 | Busta et al. | 156/628 |
| 4,916,002 | 4/1990 | Carver | 156/662 X |

*Primary Examiner*—Thi Dang
*Attorney, Agent, or Firm*—Flehr, Hohbach, Test, Albritton & Herbert

[57] ABSTRACT

A dielectric cantilever arm stylus with an integrally formed pyramidal tip is provided. The tip is molded in a pyramidal pit etched in a later-removed (100) silicon substrate. An integrally-formed cantilever arm is also formed as the tip is being formed. Various thin film materials form the cantilever arm and the tip. In one embodiment of the invention, the dielectric is silicon nitride. The cantilever arm is anodically bonded to a glass block.

8 Claims, 5 Drawing Sheets

METHOD OF FORMING MICROFABRICATED CANTILEVER STYLUS WITH INTEGRATED PYRAMIDAL TIP

This is a divisional continuation of Ser. No. 07/297,769, filed Jan. 17, 1989, now abandoned.

BACKGROUND OF THE INVENTION

1. Field of the Invention

This invention relates to apparatus and methods of forming thin film microcantilevers for use in atomic force microscopes and other microscope systems.

2. Prior Art

An atomic force microscope (AFM) scans over the surface of a sample in two different modes of operation. In one mode, the contacting mode, a sharp tip is mounted on the end of a cantilever and the tip rides on the surface of a sample with an extremely light tracking force, on the order of $10^{-5}$ to $10^{-10}$N. In the contacting mode of operation, profiles of the surface topography are obtained with extremely high resolution. Images showing the position of individual atoms are routinely obtained. In the other mode, the tip is held a short distance, on the order of 5 to 500 Angstroms, from the surface of a sample and is deflected by various forces between the sample and the tip, such forces include electrostatic, magnetic, and van der Waals forces.

Several methods of detecting the deflection of the cantilever are available which have subangstrom sensitivity, including vacuum tunneling, optical interferometry, optical beam deflection, and capacitive techniques. However, fabrication of a readily reproducible cantilever stylus assembly has been a limiting factor on use of AFM and other forms of microscopy such as scanning tunneling microscopes.

The technical requirements for a cantilever stylus assembly, which includes a cantilever arm and a protruding tip, include a number of different factors. A low force constant for the cantilever is desirable so that reasonable values of deflection are obtained with relatively small deflection forces. Typical values are 0.01–1000 N/m. A mechanical resonant frequency for the cantilever which is greater than 10 kHz is desirable to increase image tracking speed and to reduce sensitivity to ambient vibrations. Low force constants and high resonant frequencies are obtained by minimizing the mass of the cantilever.

When optical beam deflection is used to detect deflection of the cantilever, deflection sensitivity is inversely proportional to the length of the cantilever. Therefore a cantilever length of less than 1 mm is desirable.

For certain types of deflection sensing, a high mechanical Q is desirable and is achieved by using amorphous or single crystal thin films for fabrication of the cantilever.

In many applications, it is desirable that the cantilever flex in only one direction and have high lateral stiffness. This can be obtained by using a geometry such as V-shape which has two arms obliquely extending and meeting at a point at which the tip is mounted.

It is often required that a conductive electrode or reflective spot be located on the side of the cantilever opposite the tip. This is obtained by fabricating the cantilever from metal or depositing a conductive material on certain portions of the cantilever to serve as a conductor or reflector.

Finally, a sharp tip, that is, a protruding tip with a tip radius less than 500 Angstroms and which may terminate in a single atom, is desired to provide good lateral resolution. This requirement has traditionally been one of the most difficult to obtain in a reproducible manner. Typically, in the prior art, tips were made by hand using fabrication and bonding techniques which were time consuming and which produced non-uniformly performing tips.

In the prior art, cantilever arms were constructed by hand from fine tungsten wires. One way of obtaining a tip portion on such an arm was to etch the wire to a point and then bend the point to perpendicularly extend from the wire. Another way to obtain a tip was to glue a tiny diamond fragment in place at the end of a cantilever. Prior art cantilevers fabricated using photolithographic techniques did not have integrally-formed sharp protruding tips. For these cantilevers a rather dull tip was effectively obtained by using a corner of the microfabricated cantilever itself as a tip. Alternatively, a diamond fragment was glued by hand to the end of a microfabricated cantilever. The cantilever assembly of an AFM is relatively fragile and is virtually impossible to clean when it is contaminated by material from the surface being scanned so that frequent replacement is required.

Anisotropic etching of (100) silicon wafers to form pyramidal-shaped or knife-edged pits is discussed in an article by K. E. Petersen entitled "Silicon as a Mechanical Material," *Proceedings of the IEEE*, Vol. 79, No. 5, pgs. 423–430, May 1983. This article also discusses a very great decrease for anisotropic etching of silicon which is doped with boron. In effect, doping silicon with boron prevents etching. This article also refers to an article by D. A. Kiewit entitled "Microtool fabrication by etch pit replication," *Rev. Sci. Instrum.*, vol. 44, p. 1741, 1973, which discloses using thermally grown silicon dioxide as a mask for selective etching of pits in a (100) wafer and which discloses filling those pits with electrolessly deposited nickel-phosphorous.

Currently, technologists are attempting to microfabricate STMs and AFMs using the microfabrication techniques which are compatible with standard fabrication processes used in the silicon semiconductor integrated circuit industry. Their goal is to mass-produce very precise, very reliable sensors which have minimal thermal drift, signal loss, and low noise characteristics by taking advantage of the inherent low mass, high resonant frequencies, and low thermal drift characteristics of microfabricated devices. In addition, these microfabricated sensors can be integrally combined with electronic circuitry fabricated with the same processes.

SUMMARY OF THE INVENTION

It is therefore an object of the invention to provide a cantilever assembly for an AFM which is fabricated using semiconductor integrated circuit fabrication techniques.

In accordance with these and other objects of the invention, a cantilever arm stylus with an integrally-formed pyramidal tip is provided. The tip is molded in a pyramidal pit etched in a later-removed (100) silicon substrate. An integrally-formed cantilever arm is also formed as the tip is being formed. In one embodiment of the invention, the cantilever is silicon nitride. The cantilever arm is anodically bonded to a glass block. Alternative thin film such as thermally grown $SiO_2$, deposited SiO$_2$, Al$_2$O$_3$, An, and Ni are available as cantilever material or as tip material, or both.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

The fabrication process described here produces thin-film microcantilevers with integrated pyramidal tips which are ideal for use in the AFM.

Figure 1:
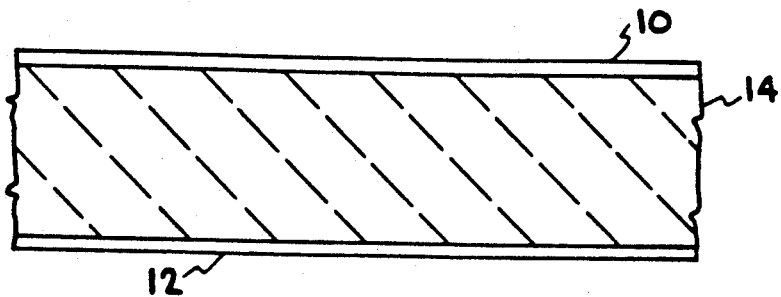
FIGS. 1 through 6 are cross-sectional views showing various process steps for forming a silicon nitride cantilever stylus.

FIG. 1 shows the process beginning with thermal growth of two 1000 angstrom thick layers 10, 12 of SiO$_2$ on a (100) silicon wafer 14.

Figure 2:
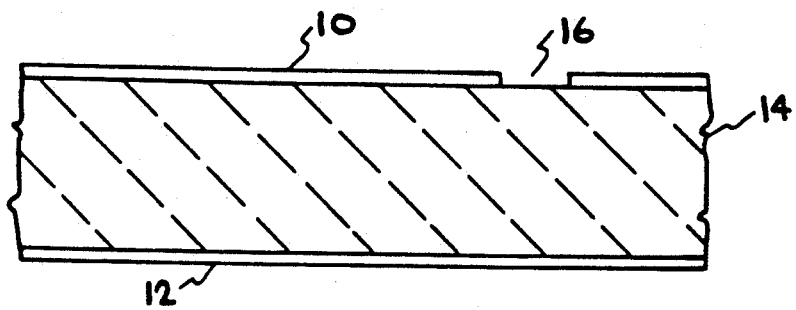

FIG. 2 shows a small circular or square hole 16 is etched in the SiO$_2$ layer 10 on the top side of the wafer using photolithographic patterning and a wet or dry oxide etch. The size of the hole determines the size of the pyramidal tip which will be formed at a later step.

Figure 3:
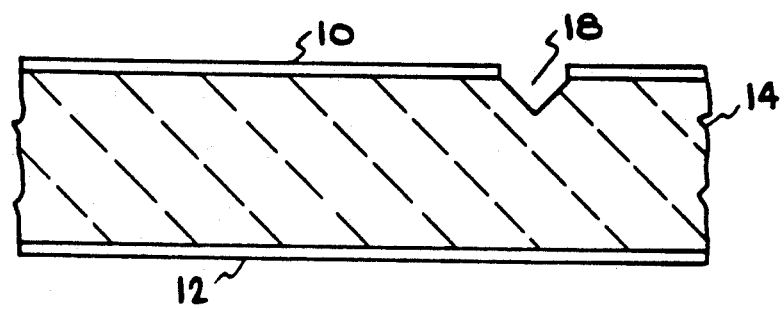

FIG. 3 shows the wafer 14 is briefly etched in KOH solution, which anisotropically etches the silicon such that the pyramidal region, or pit 18, etched away is bounded by (111) planes which intersect the edges of the original hole in the SiO$_2$ mask. If the hole is not round or square, the pyramidal pit 18 formed is not likely to terminate in a point as is desired but rather in a knife-edged shape as known in the art. Following the KOH etch, all SiO$_2$ is removed from the wafer by a wet oxide etch.

Figure 4:
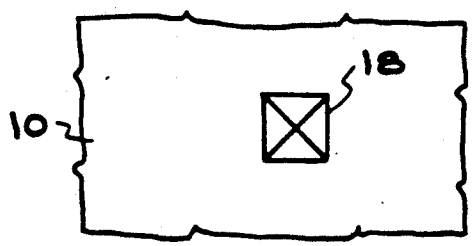

FIG. 4 shows a plan view of the pyramidal pit 18.

Figure 5:
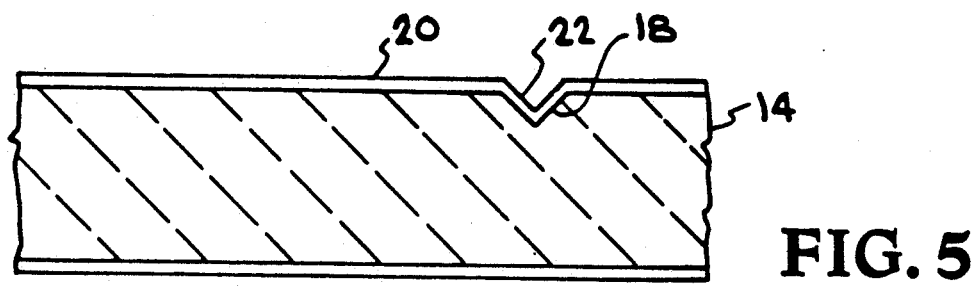

FIG. 5 shows that a layer 20 of Si$_3$N$_4$ is then deposited on the wafer by chemical vapor deposition. Following this deposition, the wafer and film are annealed in steam to prepare the surface for later anodic bonding. Annealing at 1100° C. for 4 hours has worked well. The thickness of the Si$_3$N$_4$ film determines the thickness of the cantilever and tip; 5000 angstroms has been successfully used. The Si$_3$N$_4$ film fills and conforms exactly to the shape of the pyramidal pit in the silicon wafer, which serves as a mold to produce a pyramidal tip 22.

Figure 6:
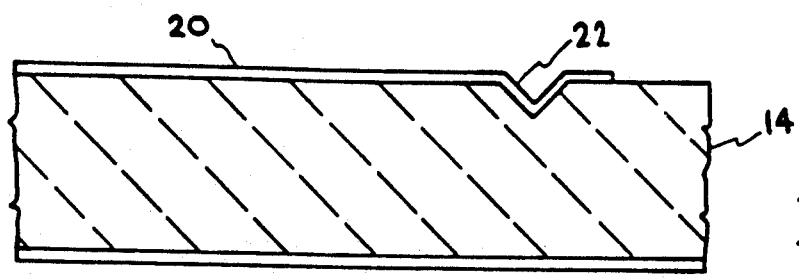

FIG. 6 shows that the Si$_3$N$_4$ film is etched into the shape of a cantilever, aligned so that the pyramidal pit 22 lies at the end of the cantilever. Photolithographic patterning and dry plasma etching have been successfully used for this step. All Si$_3$N$_4$ is removed from the bottom of the wafer as well. The silicon wafer is then ready for anodic bonding to a glass plate.

Figure 7:
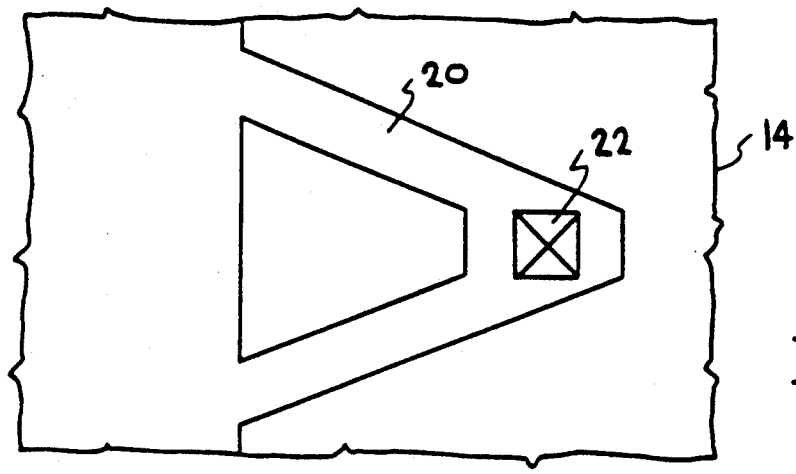
FIG. 7 is a plan view of a V-shaped cantilever stylus.

FIG. 7 shows a top view of the patterned cantilever of FIG. 6.

Figure 8:
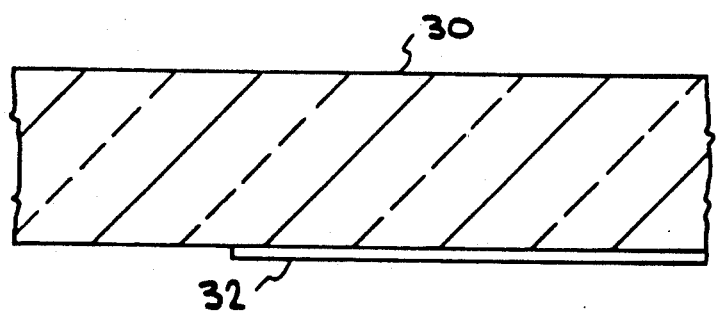
FIGS. 8 through 14 are cross sectional views showing a technique for mounting a cantilever stylus to a pyrex base.

FIG. 8 shows a borosilicate glass plate 30 (Corning 7740 or equivalent, trademarked as Pyrex) is prepared as follows: a 1000 angstrom layer 32 of Cr is deposited onto one side and patterned into a rectangular area which can be aligned over the cantilever on the silicon wafer. The purpose of the Cr layer 32 is to prevent anodic bonding over this area of the glass plate 30. Patterning of the Cr is done photolithographically with a wet Cr etchant.

Figure 9:
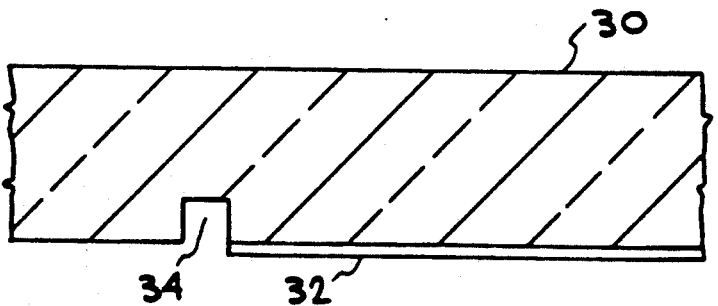

FIG. 9 shows a shallow saw cut 34 made at the edge of the Cr area with a standard precision dicing saw. The glass plate 30 is then thoroughly cleaned to remove all particles and contamination from the sawing process.

Figure 10:
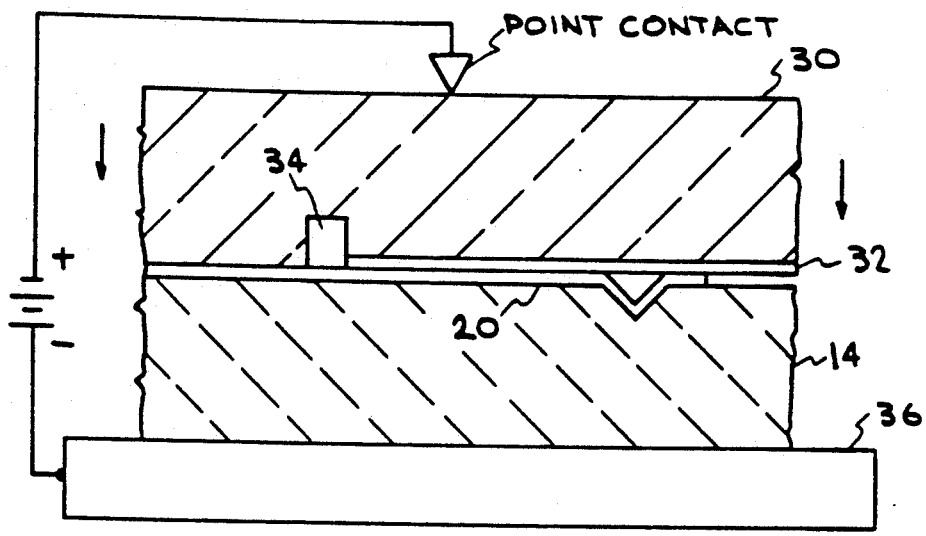

FIG. 10 shows that the glass plate is then aligned over the silicon wafer 14 such that the Cr layer 32 and saw cut 34 face the wafer. The saw cut 34 lies over the base of the cantilever 20 on the silicon wafer, and the Cr layer 32 covers the rest of the cantilever. The glass plate 30 and wafer 14 are then anodically bonded together on a hot plate 36. Successfully used parameters for bonding a 3 inch diameter wafer are: time=4 hours, temperature=475 C., applied voltage=400 VDC between a point contact on the glass and the conducting plate 36 under the silicon wafer 14.

Figure 11:
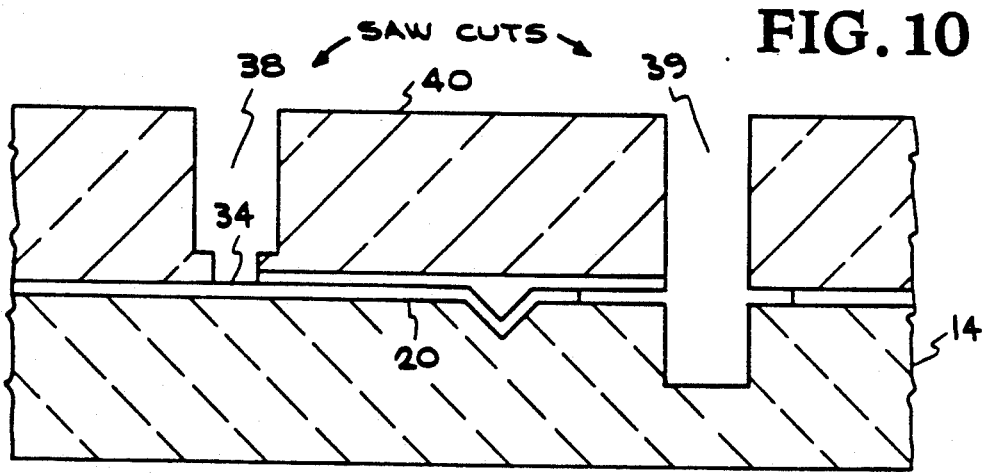

FIG. 11 shows that when the bonding is complete, an additional saw cut 38 is made from the other side of the glass which is deep enough to intersect the previous saw cut 34, but shallow enough to avoid cutting any of the silicon wafer 14. The cut 38 is aligned over the previous cut to create a cut through the glass at the base of the cantilever. Afterwards, an additional saw cut 39 is made through the glass plate 30 and partially through the silicon wafer 14 to accommodate die separation and to release the unbonded mounting block 40 of the glass plate 30 over the cantilever 20.

Figure 12:
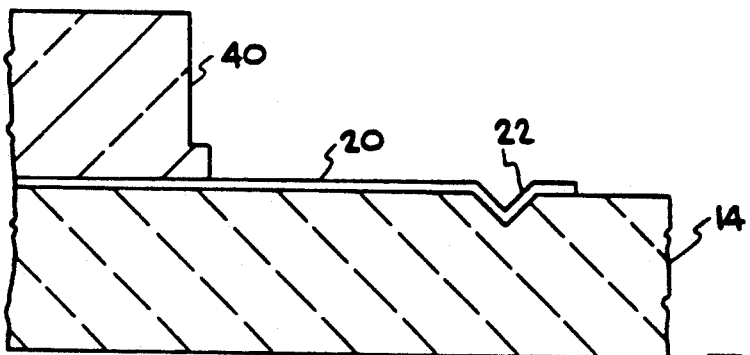

FIG. 12 shows a cantilever 20 and attached mounting block 40. The wafer is then broken into individual die. In practice, a large number of identical cantilevers are constructed simultaneously on a wafer, so each saw cut involves many cantilevers.

Figure 13:
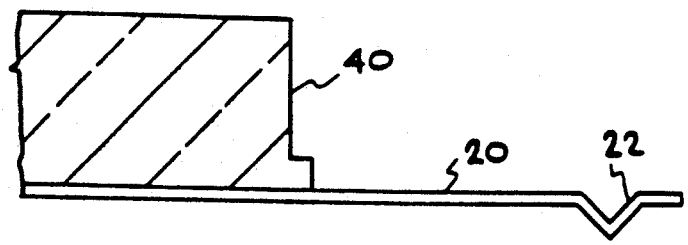

FIG. 13 shows that using a KOH etchant, all remaining silicon is etched away, leaving the cantilever 20 attached to the glass mounting block 40 at its base. The other end of the cantilever is freely suspended, with the sharp protruding pyramidal tip 22 now revealed.

Figure 14:
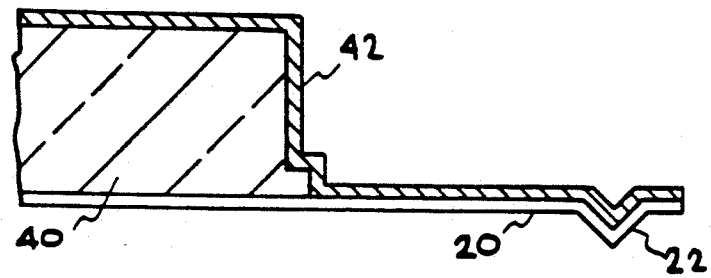

FIG. 14 shows a metal coating 42 deposited on the side of the cantilever opposite the tip to provide for deflection measurement in the AFM. A film of 500 angstroms evaporated Au over 50 angstroms evaporated Cr works well.

Figure 15:
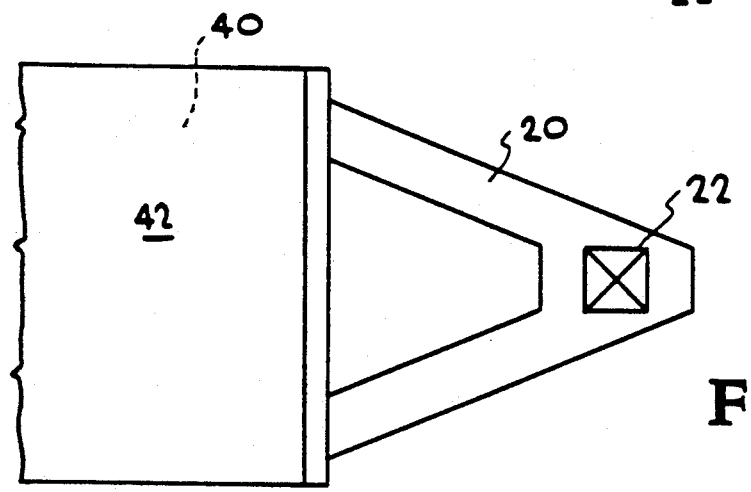
FIG. 15 is a plan view of a cantilever stylus mounted to a pyrex base as shown in FIG. 14.

FIG. 15 shows a plan view of the cantilever 20 constructed as described above.

Since each cantilever stylus structure is quite small (typical size 100×100 microns), hundreds of cantilevers can be constructed simultaneously on a single silicon wafer, taking advantage of the excellent reproducibility and low cost of batch fabrication.

A number of variations are possible in the fabrication process. For example, the initial $SiO_2$ masking film can be replaced with any material suitable as a mask for the anistropic silicon etchant. $Si_3N_4$, Ni, Cr, and Au are suitable examples. The thickness of this film is not very important. The anisotropic silicon etchant used to form the pyramidal pit is not limited to KOH; ethylenediamine/pyrocatechol/water (EDP) would also work.

The cantilevers and tips need not be made only of $Si_3N_4$. They may be fabricated of any material which can be bonded to the second substrate (in this case glass) and which is resistant to the final silicon etchant used. Deposited (as opposed to thermally grown) $SiO_2$, $Al_2O_3$, An and various metal films such as Ni are good. However, care must be taken to prevent excessive diffusion of the film material into the glass or silicon if materials such as Ni are used.

FIGS. 16 through 19 show cross-sectional views of various process steps for forming cantilevers and tips of dissimilar materials designated in the drawings, respectively, as Material A for a tip and Material B for a cantilever. Either a cantilever arm or a tip can be fabricated from $SiO_2$, $Si_3N_4$, $Al_2O_3$, diamond film, or a metal, that is Material A and Material B can be one of the listed materials. A cantilever arm can also be fabricated from deposited $SiO_2$.

Figure 16:
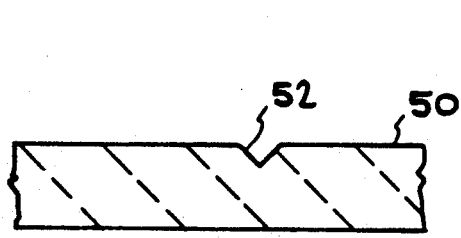
FIG. 16 through 19 are cross-sectional views showing an alternative method for forming a cantilever arm and tip from two different materials.

FIG. 16 shows a (100) silicon wafer 50 in which a pyramidal pit 52 has been formed through an opening formed in overlying silicon dioxide layer (not shown).

Figure 17:
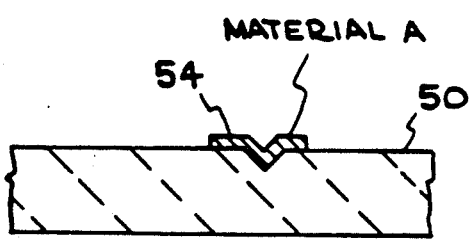

FIG. 17 shows a Material A which had been deposited over the surface of the wafer and was removed except in the small region defining a tip 54.

Figure 18:
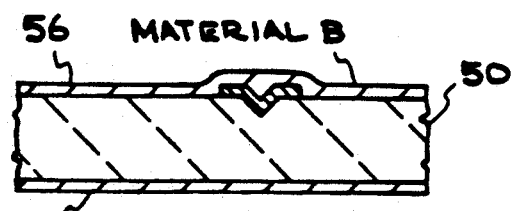

FIG. 18 shows two layers 56, 58 of Material B deposited over the surfaces of the wafer 50 and over the tip 54.

Figure 19:
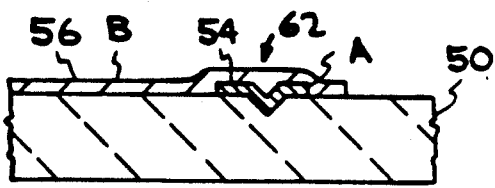

FIG. 19 shows Material B in the bottom layer 58 etched away and the top layer 56 etched to form an integral assembly 62 of the cantilever 56 and the tip 54.

Figure 20:
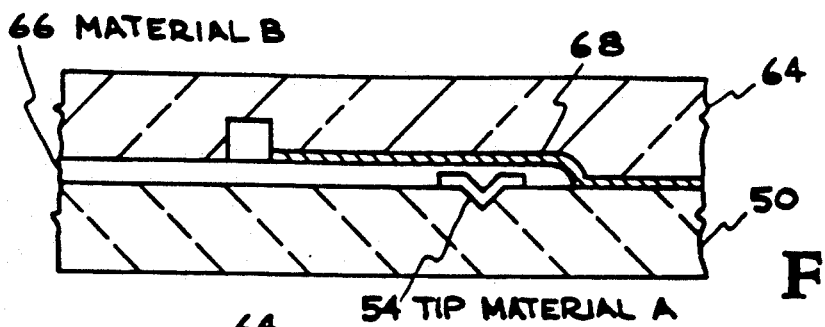
FIG. 20 is a cross-sectional view of a technique for mounting the cantilever stylus of FIG. 19.

FIG. 20 shows a pyrex block 64 anodically bonded to end 66 of the cantilever 56 opposite the tip 54. A layer of chrome 68 deposited over the cantilever prevents bonding.

Figure 21:
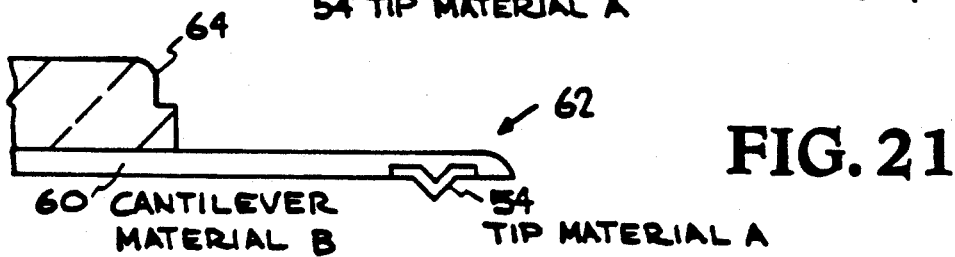
FIG. 21 is a cross-sectional view of the cantilever stylus of FIG. 20 released from its silicon substrate.

FIG. 21 shows a pyrex, or glass, block 64 obtained after appropriate saw cuts and etching away of the wafer 50 have been performed to release the integrally-formed cantilever and tip, assembly 62 where the cantilever 60 is formed from a Material B and the tip from a Material A.

Figure 22:
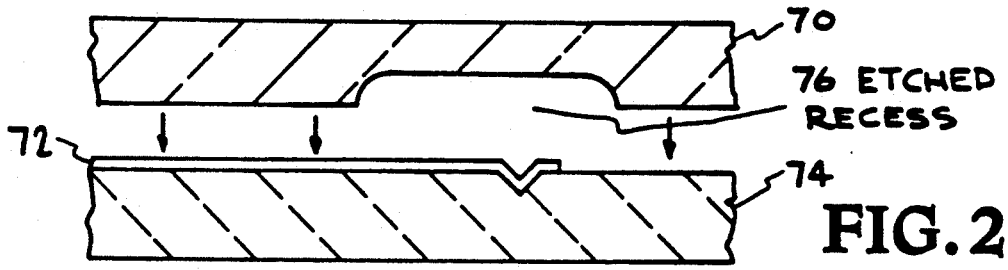
FIG. 22 is a cross-sectional view showing a recessed glass mounting plate for a cantilever arm.
Figure 23:
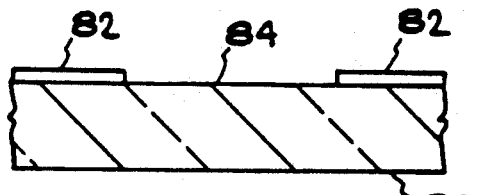
FIGS. 23 through 25 are cross-sectional views illustrating formation of a recess in a glass plate.

FIG. 22 illustrates an alternative to using a metal layer, such as chrome, to stop bonding of a pyrex or glass plate 70 to a cantilever 72 formed on a silicon wafer 74. A recess 76 is etched in the surface of the glass plate. The glass plate is then anodically bonded to the end of the cantilever 72.

FIGS. 23 through 26 illustrate a procedure for etching a glass plate 80. Using a lift-off technique or a wet chemical etch technique with a photolithographic process produces a Cr/Au pattern 82 on the surface of the glass plate 80. The Cr layer is 50 angstroms thick and the gold is 1000 angstroms thick. An opening 84 is formed in the pattern 82.

Figure 24:
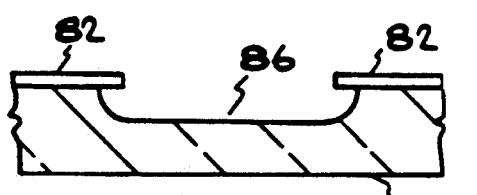

FIG. 24 shows a recess 86 formed by isotropic etching of the glass plate 80 using a $H_2O/HNO_3/HF$ mixture as an etchant. The recess is etched deeply enough so that a saw cut from the side opposite the recess 86 can intersect the recess without contacting a cantilever.

Figure 25:
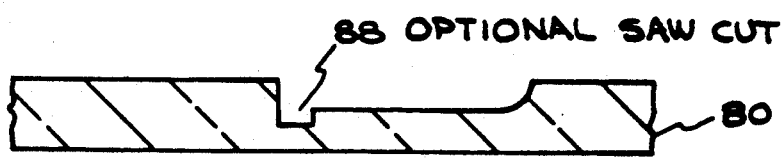

FIG. 25 shows an optional saw cut 88 formed on the recess side of the glass plate 80.

Figure 26:
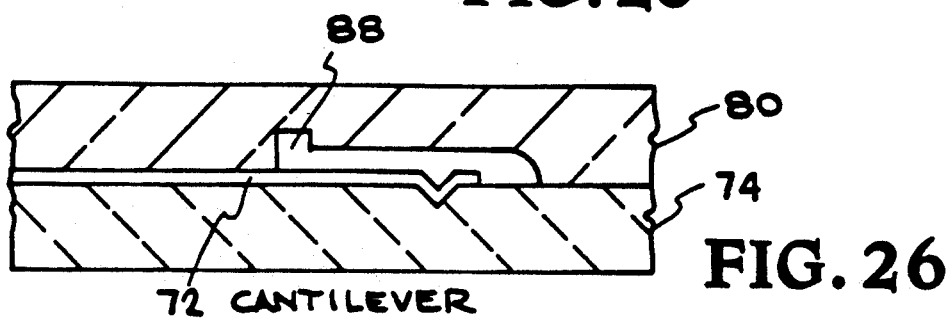
FIG. 26 is a cross-sectional view showing a recessed glass plate bonded to a cantilever arm.

FIG. 26 shows the glass plate 80 bonded to the cantilever 72.

The size and shape of the cantilever, and the size of the tip can be varied over a large range, from microns to millimeters. The bond-inhibiting film on the glass can be any of a large number of materials. Most metals are known to work, as long as excessive diffusion does not occur. The final etch of the silicon wafer 14 need not be anisotropic; any silicon etchant which does not attack the cantilever material or, to any large extent, the glass substrate is satisfactory. For some applications, the metal coating on the finished product is not needed.

In this process, a great deal of attention is given to bonding the cantilever 20 film to the glass block 40 and dissolving away all of the original silicon substrate 14. This is done so that the pyramidal tip 22 protrudes from the side of the cantilever 20 opposite the glass block 40. In the past we have successfully made cantilever styli with pyramidal tips protruding from the same side of the cantilever as the substrate as described in U.S. Patent Application by Zdeblick et al. entitled INTEGRATED SCANNING TUNNELING MICROSCOPE, Ser. No. 149,236 filed Jan. 27, 1988, assigned to the assignee of the instant application and which is incorporated herein by reference. This is easily accomplished by retaining part of the original silicon substrate. However, the substrate gets in the way and does not provide adequate clearance for bringing the tip into contact with the sample in the AFM. The tip should be the absolute "low point" of the assembly; hence all of the effort involved in the bonding process is indeed necessary, and this film transfer method is an important innovation in the fabrication process for microminiature cantilevers.

The bonding process described here is also suitable for use with other types of tips which would normally protrude from the "wrong side" of a cantilever for AFM applications.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. A method of forming a microminiature cantilever, the steps of the method comprising, in sequence:

forming a thin film cantilever arm on a first substrate, said thin film cantilever arm having a tip at a first end of said cantilever arm, said tip projecting into said substrate;

connecting a second substrate to a fixed end of said thin film cantilever arm, said second substrate being connected to a surface of said thin film cantilever arm distal said first substrate so that said tip projects away from said second substrate; and after said connecting step, substantially removing said first substrate.

2. The method of forming a microminiature cantilever set forth in claim 1, said forming step including forming a pyramidal tip which is oriented substantially orthogonal to a surface of said first substrate.

3. A method of fabricating a thin film cantilever arm and tip, comprising the steps of:

providing a silicon substrate having a top surface;

forming a masking layer on the top surface of said silicon substrate; said masking layer having an opening formed therein;

anisotropically etching said silicon substrate through said opening to form a pyramidal pit in the top surface of said silicon substrate;

removing said masking layer;

depositing thin film material in said pyramidal pit and on the top surface of said silicon substrate;

patterning said thin film material to form a cantilever arm having an integrally formed pyramidal tip at one end;

connecting a second substrate to an end of said cantilever arm distal said pyramidal tip, said second substrate being connected to the surface of said thin film material; whereby said tip projects away from said second substrate; and after said connecting step, removing said silicon substrate to free said cantilever arm.

4. The method of claim 3, wherein said thin film material is silicon nitride deposited by chemical vapor deposition.

5. The method of claim 3 wherein said thin film material is selected from the group consisting of deposited $SiO_2$, $Al_2O_3$, Au, the top surface of said silicon substrate;

patterning said thin film material to form a cantilever arm having an integrally formed pyramidal tip at one end;

connecting a second substrate to an end of said cantilever arm distal said pyramidal tip, said second substrate being connected to the surface of said thin film material; whereby said tip projects away from said second substrate; and after said connecting step, removing said silicon substrate to free said cantilever arm.

6. A method of fabricating a cantilever arm and tip, comprising the steps of:

providing a silicon substrate having a top surface;

forming a masking layer on the top surface of said silicon substrate; said masking layer having an opening formed therein;

anisotropically etching said silicon substrate through said opening to form a pyramidal pit in the top surface of said silicon substrate;

removing said masking layer;

depositing a first layer of a first thin film material in said pyramidal pit in the top surface of said silicon substrate to form a pyramidal tip, and depositing a second layer of second thin film material on the top surface of said silicon substrate and on top of said first layer of said first thin film material so as to form a cantilever arm connected to said first layer of said first thin film material, wherein said second thin film material is dissimilar to said first thin film material;

patterning and forming a cantilever structure in said second layer of thin film material; and connecting a second substrate to an end of said cantilever arm distal said pyramidal tip, said second substrate being connected to the surface of said second thin film material; whereby said tip projects away from said second substrate; and after said connecting step, removing said silicon substrate to free said cantilever structure having an integrally formed cantilever arm and pyramidal tip.

7. The method of claim 6 wherein said first layer of said first thin film material and said second layer of said second thin film material are each selected from the group consisting of deposited $SiO_2$, $Al_2O_3$, Au, Ni, $Si_3N_4$, and thermally grown $SiO_2$.

8. A method of fabricating a thin film cantilever arm and tip, comprising the steps of:

providing a silicon substrate having a top surface;

forming a masking layer on the top surface of said silicon substrate; said masking layer having an opening formed therein;

etching said silicon substrate through said opening to form a trench in the top surface of said silicon substrate;

removing said masking layer;

depositing thin film material in said trench and on the top surface of said silicon substrate;

patterning said thin film material to form a cantilever arm having an integrally formed tip at one end;

connecting a second substrate to an end of said cantilever arm distal said tip, said second substrate being connected to the surface of said thin film material; whereby said tip projects away from said second substrate; and after said connecting step, removing said silicon substrate to free said cantilever arm.

* * * * *